US009043848B2

(12) United States Patent
Michael et al.

(10) Patent No.: US 9,043,848 B2
(45) Date of Patent: *May 26, 2015

(54) SYSTEM AND METHOD FOR INTERACTIVE SPATIO-TEMPORAL STREAMING DATA

(71) Applicants: Christopher J. Michael, Mandeville, LA (US); Bruce Y. Lin, New Orleans, LA (US); Elias Z. K. Ioup, New Orleans, LA (US); John T. Sample, Pearl River, LA (US)

(72) Inventors: Christopher J. Michael, Mandeville, LA (US); Bruce Y. Lin, New Orleans, LA (US); Elias Z. K. Ioup, New Orleans, LA (US); John T. Sample, Pearl River, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,201

(22) Filed: Mar. 10, 2014

(65) Prior Publication Data

US 2014/0282768 A1   Sep. 18, 2014

Related U.S. Application Data

(60) Provisional application No. 61/777,019, filed on Mar. 12, 2013.

(51) Int. Cl.
| H04N 7/173 | (2011.01) |
| H04N 21/258 | (2011.01) |
| H04N 21/231 | (2011.01) |
| G06T 1/60 | (2006.01) |

(52) U.S. Cl.
CPC ... *H04N 21/25825* (2013.01); *H04N 21/23106* (2013.01); *G06T 1/60* (2013.01)

(58) Field of Classification Search
CPC ............. H04N 21/25825; H04N 21/23106
See application file for complete search history.

(56) References Cited

U.S. PATENT DOCUMENTS

| 2008/0140227 A1* | 6/2008 | Attarwala ................. 700/30 |
| 2009/0019496 A1* | 1/2009 | Amira et al. .............. 725/61 |
| 2010/0023960 A1* | 1/2010 | Hasson ..................... 725/14 |
| 2011/0202847 A1* | 8/2011 | Dimitrov .................. 715/738 |
| 2012/0185772 A1* | 7/2012 | Kotelly et al. ............ 715/719 |
| 2014/0280676 A1* | 9/2014 | Michael et al. ........... 709/213 |

OTHER PUBLICATIONS

U.S. Appl. No. 61/777,019, Christopher J. Michael, et al, Stochastic Caching Algorithm for Interactive Spatio-Temporal Streaming Data, filed Mar. 12, 2013.

Kim, Sun-Euy, Das, Chita R. and Sivasubramaniam, Anand, Performance Analysis of a Buffer Management Technique for Interactive Video-On-Demand, submitted to World Scientific, pp. 1-22, Aug. 30, 2000.

(Continued)

*Primary Examiner* — Joshua Taylor
(74) *Attorney, Agent, or Firm* — US Naval Research Laboratory; Joslyn Barritt; Kathleen Chapman

(57) ABSTRACT

System and method for providing a probabilistic order of tiles relative to a current section of a video that a user is viewing. A cache implementation uses this ordering to decide what tiles to evict from the cache, i.e. which tiles will probably not be accessed within a particular timeframe, but not when to evict (this is up to the cache implementation). A cache implementation can also use the prioritized list of the present embodiment to pre-fetch tiles.

10 Claims, 5 Drawing Sheets

(56) References Cited

OTHER PUBLICATIONS

Li, Victor O.K., Liao, Wanjiun, Qiu, Xiaoxin and Wong, Eric W.M., Performance Model of Interactive Video-on-Demand Systems, IEEE Journal on Selected Areas in Communications, vol. 14, No. 6, pp. 1099-1109, Aug. 1996.

Heymann, S., Smolic, A., Mueller, K. Guo, Y, Rurainsky, J., Eisert, P., Wiegand, T., Representation, Coding and Interactive Rendering of High-Resolution Panoramic Images and Video Using MPEG-4, in Proc. Panoramic Photogrammetry Workshop, 2005.

Porter, Reid, Fraser, Andrew M., and Hush, Don, Wide-Area Motion Imagery, IEEE Signal Processing Magazine, pp. 56-65, Sep. 2010.

* cited by examiner

50

27
example_state.tile_set = { A[$x1$][$y1$][$z1$][$u1$], A[$x2$][$y2$][$z2$][$u2$], ... }
                             29               31
example_state.action_set = { play: *p_play*, pan: *p_pan*,
              33            35
        zoom: *p_zoom*, seek: *p_seek* }

200 →

201
| Video | 8192×8192p | VTM | |
|---|---|---|---|
| $L$ | 5 levels | Tile Size | 512×512p |
| $U$ | 150k frames | Screen Size | 800×800p |
| Interaction Model | | $max(t)$ | 2000 actions |
| $p.z$ | 0.25 | $\sigma_z$ | 0.2 |
| $s$ | 0.05 | $\sigma_p^x, \sigma_p^y$ | 200 |
| $\mu_p^x, \mu_p^y, \mu_s, \mu_z$ | 0.0 | $\sigma_s$ | 5 |

300 →

| Set | 1 | 2 | 3 | 4 | 5 |
|---|---|---|---|---|---|
| $max(t)$ | 505 | 825 | 573 | 738 | 492 |
| play (%) | 50 | 64 | 60 | 72 | 65 |
| pan (%) | 17 | 22 | 22 | 15 | 20 |
| zoom (%) | 6 | 12 | 16 | 11 | 15 |
| seek (%) | 27 | 1 | 2 | 2 | 0 |
| $m(\Delta_x)$ | 0 | -4 | -13 | -30 | -16 |
| $s(\Delta_x)$ | 147 | 204 | 249 | 295 | 166 |
| $m(\Delta_y)$ | -1 | 3 | 13 | 13 | 19 |
| $s(\Delta_y)$ | 52 | 250 | 339 | 175 | 194 |
| $m(\Delta_z)$ | 0.00 | 0.00 | -0.01 | 0.01 | -0.01 |
| $s(\Delta_z)$ | 0.03 | 0.11 | 0.10 | 0.08 | 0.07 |
| $m(\Delta_u)$ | 42 | -37.6 | -8 | -5 | 0 |
| $s(\Delta_u)$ | 203 | 108.1 | 23 | 163 | 0 |
| $T = 1, size = 10$ | | | | | |
| conv | 0.47 | 0.59 | 0.57 | 0.70 | 0.64 |
| near | 0.50 | 0.68 | 0.71 | 0.80 | 0.75 |
| stoc | 0.48 | 0.68 | 0.68 | 0.82 | 0.74 |
| $T = 5, size = 100$ | | | | | |
| conv | 0.59 | 0.66 | 0.64 | 0.67 | 0.76 |
| near | 0.31 | 0.49 | 0.51 | 0.46 | 0.48 |
| stoc | 0.52 | 0.75 | 0.77 | 0.80 | 0.82 |
| $T = 10, size = 500$ | | | | | |
| conv | 0.57 | 0.59 | 0.53 | 0.62 | 0.62 |
| near | 0.23 | 0.49 | 0.53 | 0.45 | 0.45 |
| stoc | 0.49 | 0.79 | 0.79 | 0.76 | 0.76 |

FIG. 3

SYSTEM AND METHOD FOR INTERACTIVE SPATIO-TEMPORAL STREAMING DATA

CROSS-REFERENCE TO RELATED APPLICATIONS

This application claims the benefit of priority based on U.S. Provisional Patent Application No. 61/777,019, entitled STOCHASTIC CACHING ALGORITHM FOR INTERACTIVE SPATIO-TEMPORAL STREAMING DATA, filed on Mar. 12, 2013, the entirety of which is hereby incorporated by reference into the present application.

BACKGROUND

Methods and systems disclosed herein relate generally to caching data. More specifically, the methods and systems disclosed herein related to a method by which spatially and temporally interactive streaming visual data of high density, such as, for example, but not limited to, video data, may be effectively cached in order to mitigate strain on network and I/O bandwidth.

Current methods for exploitation of spatially and temporally interactive streaming visual data typically involve three main components: The originating data set, which houses the partial or complete collection of the data to be accessed; the client application, which allows a user to view and navigate the available data via interactive query; and the retrieval algorithm, which processes the user's query in order to retrieve data from the originating data set. An interactive query is one which is constructed through a user's interaction with the client's spatial and temporal interface via actions such as continuous playing, seeking in time, panning, and zooming through some defined range of space and time. Each query will then specifically be composed of some bounded spatial range at a single point in time.

As data density increases, so does the bandwidth required to fulfill each query. Moreover, as the frequency of requests to the originating data increases, so does the aggregate latency by which the user receives the data. In the common case of the originating data set being housed remotely from the client, and in situations where multiple clients are viewing the same data, these bandwidth and latency requirements can quickly exacerbate network traffic and lag, which makes the interactive streaming data unreasonably difficult to view.

Client applications typically implement naïve caches that will keep recently retrieved data in memory or on disk to exploit temporal locality (the phenomenon that if a datum has been referenced, it is likely that it will again be referenced in the near future). In instances where the same query is made multiple times within a short time, the retrieval algorithm will bypass the originating data set for the local cache in order to fulfill the query. These caches may implement a Least Recently Used (LRU) policy in order to evict data when the cache gets filled. Slightly more effective caches may exploit spatial locality (the phenomenon that if a datum has been referenced recently, it is likely that nearby data may be referenced) to some degree for eviction policies.

Most retrieval algorithms will retrieve corresponding data to satisfy the user's query each time one is made, only occasionally having the opportunity of bypassing the originating data set with references to the simple cache described above. A more effective retrieval algorithm may prefetch data into the client's cache, guessing at future queries in order to minimize the aggregate latency. In the current state of the art, prefetching may be done using a Region-of-Interest (ROI) detector. However, implementations of these detectors are either crowd sourced, requiring many users to examine a relatively small range of the data, or employ a significant amount of preprocessing overhead to detect ROIs within the interactive streaming data's context. Though these detectors work well in certain situations, they are not considered as a general purpose solution due to their dependence on a smaller search space and customized detection algorithms.

What is needed is a method for effectively caching large amounts of data to mitigate the strain on network and I/O bandwidth.

SUMMARY

The system and method of the present embodiment provide a probabilistic order of tiles relative to a current section of a video that a user is viewing. A cache implementation uses this ordering to decide what tiles to evict from the cache, i.e. which tiles will probably not be accessed within a particular timeframe, but not when to evict (this is up to the cache implementation). A cache implementation can also use the prioritized list of the present embodiment to pre-fetch tiles.

The most common form of interactive streaming data is high-spatial-resolution video. For simplified terminology, the remainder of this disclosure will assume that the originating dataset is this type of video, and terms relating to video will be used. There are many modes of operation applicable to the present embodiment. The present embodiment provides a probabilistic ordering of tiles relative to the current viewport. A cache implementation can use this ordering to decide what tiles to evict, and the cache implementation decides when to evict the tiles.

The present embodiment relies on a conventional video model that is consistent with many current implementations. S. Heymann et al., *Representation, coding, and interactive rendering of high-resolution panoramic images and video using mpeg-4*, The 2nd Panoramic Photogrammetry Workshop, 2005. In the present embodiment, a tile is defined as a fixed-size image of a manageable resolution for the display; for example, but not limited to, 512×512 pixels. The tile is the lowest level of granularity for image retrieval, meaning that the retrieval method can request these fixed tiles even though much of the tile may not be of the user's interest. Normally, the client application trims out unrequested parts of the tile prior to display. Because the resolution of a high-spatial-resolution video is typically much higher than that of conventional displays, each frame of the video is processed into an L-level Gaussian pyramid where level $l \in [1, L]$ is composed by a mesh of $2^{l-1}$ rows and $2^{l-1}$ columns of tiles that constitute a full frame. This pyramid also helps manage bandwidth by eliminating retrieval of details that will not be viewable by the user due to the resolution of the display and the zoom level.

The method of the present embodiment can prioritize tiles for prefetching, or buffering, spatial and temporal data based on a stochastic human-behavioral model, adaptively without crowd-sourcing trajectories or exploiting video context to detect regions of interest. The advantages of prefetching the data according to the present embodiment that immense data sets such as high-spatial-resolution video can be managed efficiently and accurately with little or no overhead. The method can scale to large cache sizes and high network bandwidths.

These and other aspects and features of the present teachings will become apparent from the following detailed description of the exemplary embodiments, read in conjunction with, and with reference to, the accompanying drawings.

BRIEF DESCRIPTION OF THE DRAWINGS

Referring now to the drawings, in which like numerals represent like elements, aspects of the exemplary embodiments will be described in connection with the drawing set.

FIG. 3 is a set of tables recording the results of comparison tests of the system of the present embodiment;

DETAILED DESCRIPTION

The problems set forth above as well as further and other problems are solved by the present teachings. These solutions and other advantages are achieved by the various embodiments of the teachings described herein below.

In the present embodiment, a video tile matrix (VTM) is the matrix representation of an entire video containing U frames. For example, the VTM can be a four-dimensional matrix each of whose elements $A_{x,y,z,u}$ $\forall x, y \in [1, 2^{L-1}]$; $z \in [1, L]$; $u \in [1, U]$ map to a single tile in the video. Though every tile will be paired with at least one element of the matrix, multiple elements of the matrix may map to a single tile. This is due to the fact that x and y in level l map to the tile in column $$\left\lceil x / \left(\frac{2^{L-1}}{2^{l-1}}\right)\right\rceil$$

and row $$\left\lceil y / \left(\frac{2^{L-1}}{2^{l-1}}\right)\right\rceil$$

respectively.

The current section of the video that a user is viewing is referred to herein as the viewport. The tiles needed to fill the viewport at any point in can be referenced by a contiguous set in an "x-y slice" of the VTM where the pyramid level z and frame u are constant. The level of the pyramid can be selected to be that of fewest tiles needed to fulfill the user's requested viewport while producing a non-obfuscated image. The full video resolution pixels which span the current viewport are referred to herein as the viewport pixels.

Figure 1:
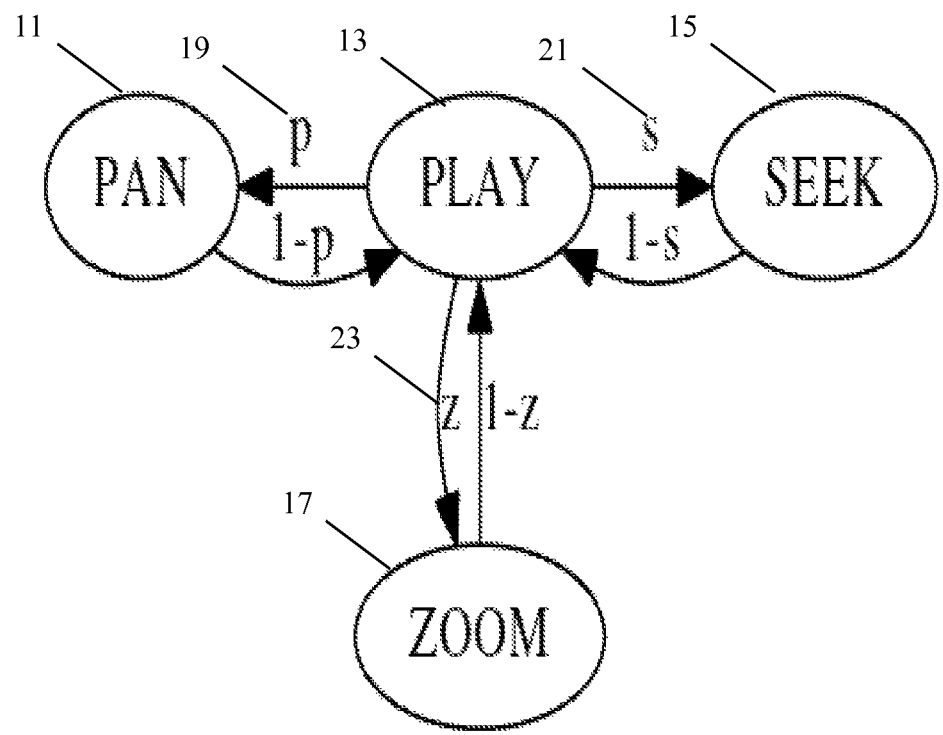
FIG. 1 is a pictorial representation of a defined set of action functions.

Referring now to FIG. 1, the method of the present embodiment includes a stochastic process that describes the user's navigation through a video. A defined set of action functions can be used to describe an action a that takes place at time t: pan 11, play 13, seek 15, and zoom 17. A ratio of viewport pixels to full-frame pixels is referred to herein as a view ratio. The following is a set of exemplary action functions:

play( ): Progress the video forwards in time by one frame;
seek($\Delta_u$): Progress the video $\Delta_u \neq 1$ frames;
pan($\Delta_x, \Delta_y$): Shift the viewport by $\Delta_x$ pixels horizontally and $\Delta_y$ pixels vertically; and
zoom($\Delta_z$): Zoom the viewport in by a view-ratio difference of $\Delta_z$.

These four functions and the video model can describe a user's trajectory through the video. A Markov chain can describe the stochastic user-interaction model (Li, V. O. K., et al., *Performance model of interactive video-on-demand systems, IEEE Journal on Selected Areas in Communications*, vol. 14, no. 6, pp. 1099, 1109, August, 1996, doi: 10.1109/49.508281), which can impact the way in which the tiles are prioritized by the method of the present embodiment. Probabilities p 19, s 21, and z 23 describe the transitions from one action to another. Steady state probabilities are calculated to be the following:

$$P[\text{play}] = \frac{1}{1 + \frac{p}{1-p} + \frac{z}{1-z} + \frac{s}{1-s}}$$

$$P[\text{pan}] = \frac{p}{1-p} * P[\text{play}]$$

$$P[\text{zoom}] = \frac{z}{1-z} * P[\text{play}]$$

$$P[\text{seek}] = \frac{s}{1-s} * P[\text{play}]$$

Upon visiting a state in the Markov chain, a viewport is progressed through the VTM according to the corresponding action functions. The method of the present embodiment can generate a prioritized list of tiles in order from highest to lowest calculated probability of retrieval. This list can be used by both a retrieval algorithm to prefetch tiles into the cache and a cache eviction policy to decide which tiles to evict. The method can maintain a state set that can represent possible trial outcomes. The state set can be used to gather information from each state in the list to generate the output prioritized list. Each state in the state list is a data structure that contains a set of tiles that corresponds to some viewport and the set of possible actions for the state. Each listed action can have a corresponding probability.

Figure 2:
FIG. 2 is a computer listing of exemplary pseudo-code defining sets of actions.

Referring now to FIG. 2, pseudo code 50 is an example of a state. Italicized variables 27 in the code represent numerical values. Probabilities p_play 29, p_pan 31, p_zoom 33, and p_seek 35 are calculated upon creation of the state using the steady state probabilities of the Markov chain in the user-interaction model and a chosen action function from a previous state. The VTM references are calculated upon creation of the state using the tile set and the chosen action function from a previous state.

The method of the present embodiment includes a step of initializing by setting the state list to one initial state. This initial state's tile set is set to the VTM references of all the tiles in the current viewport. The probabilities in the state's action list are set to those steady-state probabilities calculated from the user interaction model (i.e. p_play=P [play], and so on). Each action set of every state in the state set is traversed to find the highest probability overall each time the method is executed. The state containing the highest probability is referred to herein as the active state. When the highest probability is found, the corresponding action is removed from the active state's action set and a new state is added to the state list. The new state's tile set and action set are calculated stochastically depending on the video model, the user-interaction model, and operating modes described later. Operating in the mode Gaussian, non-adaptive, non-temporal, non-spatial, the new state's tile set and action set are calculated as follows, with parameters and functions defined herein:

$\mu_p^x, \mu_p^y, \mu_z, \mu_s$: The mean of the Gaussian function corresponding to $\Delta_x, \Delta_y, \Delta_z,$ and $\Delta_s$ respectively;

$\sigma_p{}^x$, $\sigma_p{}^y$, $\sigma_z$, $\sigma_s$: The standard deviation of the Gaussian function corresponding to $\Delta_x$, $\Delta_y$, $\Delta_z$, and $\Delta_s$ respectively;

q( ): A function that takes as input the current viewport and the pixels panned in the horizontal or vertical direction and returns a VTM offset reference; and r( ): A function that takes as input the current viewport and the view ratio zoomed and returns a VTM offset reference.

The q and r functions are needed because pixels and view ratios do not immediately map to the VTM. The q and r functions can be created deterministically for any given viewport. Upon the corresponding actions on a tile referenced by $A_{x,y,z,u}$, tiles can be marked as follows:

play: $A_{x,y,z,u+1}$ pan: $A_{x+q(\mu_p{}^x)+i,y+q(\mu_p{}^y)+j,z,u} \forall i\in[-q(\sigma_p{}^x),q(\sigma_p{}^x)], \forall j\in[-q(\sigma_p{}^y),q(\sigma_p{}^y)]$ zoom: $A_{x,y,z+r(\mu_z)+i,u} \forall i\in[-r(\sigma_z),r(\sigma_z)]$ seek: $A_{x,y,z,u+\mu_s+i} \forall i\in[-\sigma_s,\sigma_s]$ The method of the present embodiment can iterate through every tile in the active state's tile list, and can mark tiles as above. The marked tiles can be the tile set for a newly created state. Upon completion, the method of the present embodiment can either terminate because the aggregate number of tiles, excluding duplicates, in the states' tile sets are sufficient, or the method can repeat execution, calculating the highest probability action across all states in the state list and repeating the subsequent steps in order to further mark tiles. With respect to the pan and zoom actions, the values for $\mu$ and $\sigma$ may not be large enough to have an impact in the tile marking process. In such cases where spatial thresholds are not met, the method may retain the aggregate in a variable to count for the next pan or zoom action. Once the threshold is met, the variable may be reset.

To refine the method to attain more accurate results, actions can be filtered to bypass those difficult to predict. For example, if the human-interaction model's value for $\sigma_s$ is set unreasonably high, the method may choose to replace all seek operations with play operations during tile marking.

Four stochastic-mode parameters that the method uses to calculate probabilities and simulate actions in order to prefetch tiles—probability mass function, adaptivity, temporality, and spatiality—are summarized in the table below by order of complexity of implementation.

| | | | Complexity |
|---|---|---|---|
| Spatiality | Temporality | Adaptivity | Probability Mass Function |
| Non-spatial | Non-temporal | Non-adaptive | Gaussian |
| Spatial | Temporal | Adaptive | Histogram |

The probability mass function can be used to calculate tile probabilities in the tile marking process. It may be defined as, for example, but not limited to, either a Gaussian function or a histogram. During the tile-marking process, the mean and standard deviation can be used to find a highly probable range of action. The Gaussian function can be used, for example, if the user's behavior resembles a normal distribution. The histogram of past and/or estimated trajectory statistics can be used otherwise. Each bin of the histogram is analyzed in order of magnitude. The following steps describe a general implementation of a histogram in the interaction model:

Define some histogram m with I bins. A separate histogram is defined for each of the action parameters (i.e. $m^x$, $m^y$ for the pan action, $m^z$ for the zooming action, and $m^u$ for the seek action) such that the value $m_i$ is the aggregate observed outcomes corresponding to bin i.

Define the probability of some bin i as $P_i = m_i / \Sigma m_1$

Choose the n highest $P_i$-valued bins in m where n is the maximum number s.t. $n*r \leq \sigma$ where r is the bin size and $\sigma$ is the standard deviation of m. Put the values for these bins in a set K. When marking tiles, choose which to mark according to the following formulas (note functions q and r used previously):

a. play: $A_{x,y,z,u+1}$ b. pan: $A_{q(k)\forall k\in K^x, q(k)\forall k\in K^y, z, u}$ c. zoom: $A_{x,y,r(k)\forall k\in K^z, u}$ d. seek: $A_{x,y,z,k\forall K^u}$ Using these steps, the most commonly used values of the action parameters can be considered when prioritizing tiles with no underlying implications of the distribution.

The parameters of the interaction model can either remain static (referred to herein as non-adaptive) during viewing of a video, or change to suit the behavior of a single user or group of users, referred to herein as adaptive. The non-adaptive case can allow for a minimum of computation during viewing. In the adaptive case, the method may need to be run multiple times during execution to produce updated results. Using an adaptive mode can potentially boost performance since the user-interaction model may better reflect current trajectories through the video.

If the user-interaction model's parameterization changes depending on the frame of the current viewport in the video, the user-interaction model's parameterization is referred to herein as temporal as opposed to non-temporal. When operating in the temporal mode, the probability mass function parameterization changes according to some partition of the frames in the video. Similarly, if the user-interaction model's parameterization changes depending on the spatial position (dealing with $\Delta_x$, $\Delta_y$, $\Delta_z$), then the user-interaction model's parameterization is referred to herein as spatial mode as opposed to non-spatial mode. The spatial and temporal modes, especially in the adaptive case, inherently allow for Region of Interest detection and exploitation. The advantage in using the operating mode Gaussian function, non-adaptive, non-temporal, non-spatial lies in relatively low computational overhead. Because the output VTM references do not change relative to the position of a single tile in the viewport, the output will only have to be generated once for any video. This is done by generating a VTM offset list instead of the absolute VTM references described above. During viewing of the video, these offsets and the tiles in the current viewport are used to generate a prioritized list from any selected viewport, possibly yielding lower computation overhead. To accommodate for tiles computed out of range or duplicate tile references, the cache size can be overcompensated for in the single execution of the method.

Referring now to FIG. 3, the method of the present embodiment was compared to the two prior art techniques. The prior art techniques for caching high-spatial-resolution video either prioritize tiles by nearest neighbor in the VTM or forwards in time. Prioritizing tiles forwards in time mimics the way in which non-interactive video is buffered. Properties of the video and parameterization of the method of the present embodiment are shown in the table 200. The values for user-interaction model 201 have been set, for example, but not limited to, after observation of several users' trajectories. Table 300 shows some statistics and results for various human-generated trajectories 315 of an aerial persistent-surveillance video. Row 301 shows the number of actions; rows 303 show the distribution of these actions. Rows 305 show values of the mean (m) and standard deviation (s) of the action-function parameters. Experiments were used to compare the method of the present embodiment (stoc 311) to conventional techniques cony 307 and near 309. Conv 307 prioritizes tiles only forwards in time from the current viewport. Near 309 prioritizes tiles by the nearest neighbor in the VTM. Experiments were conducted for several values of T, the period at which the cache is instantly refreshed to the tiles referenced by the output of the different techniques, and size, the cache size in tiles. The results are shown in cache hit ratios 313, which are the ratios of cache hits to total tile requests. In the majority of results, the method of the present embodiment stoc 311 outperforms cony 307 and near 309 by an average of 8% across all cache hit ratios 313 and reaching 50% better performance in the best case.

Figure 4:
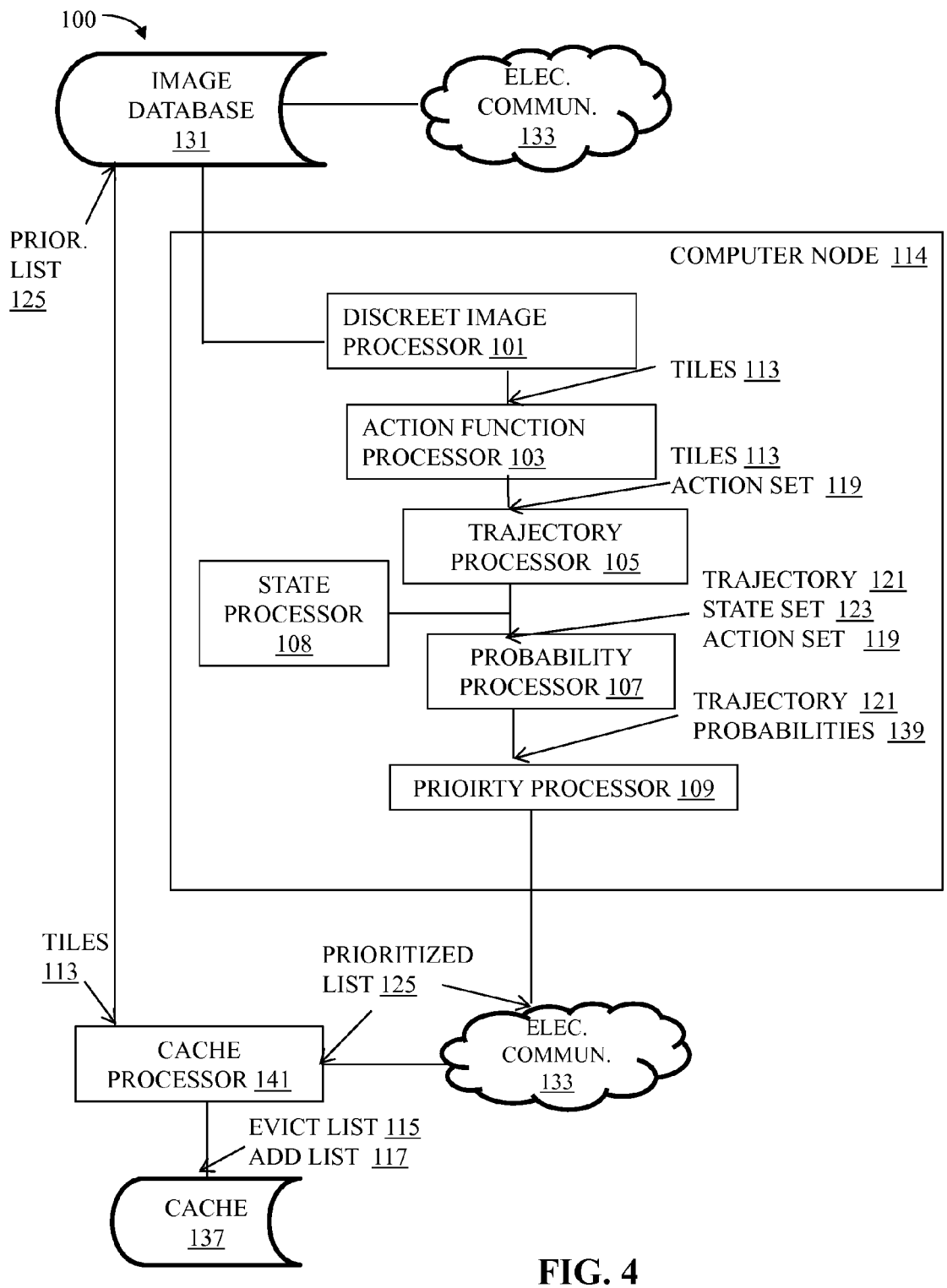
FIG. 4 is a schematic block diagram of one embodiment of the system of the present teachings.

Referring now to FIG. 4, system 100 for prioritizing image tiles can include, but is not limited to including, discreet image processor 101 automatically creating a discretized representation of an image, the image including tiles 113, each tile 113 being mapped to at least one element of the discretized representation. System 100 can also include action function processor 103 automatically defining a set of action functions 119 describing each action of navigation of the image, and trajectory processor 105 automatically describing trajectory 121 through the image based action functions 119. System 100 can still further include probability processor 107 automatically computing probabilities 139 of transition from one of the actions to another of the actions in the trajectory 121, and priority processor 109 automatically generating prioritized list 125 of image tiles 113 based on probabilities 139. System 100 can optionally include cache processor 141 prefetching tiles 113 into cache 137 based on add list 117, and evicting tiles 113 from cache 137 based on evict list 115. Cache processor 141 can create evict list 115 and add list 117 based on prioritized list 125.

Continuing to refer to FIG. 4, system 100 can further optionally include state processor 108 including computer code (a) setting a list of states to an initial state, the initial state including a tile set having references to the discretized representation of the image of the tiles in the viewport, (b) setting the probabilities of the list of possible actions for the state equal to the steady state probabilities, (c) traversing each of the list of possible actions of each of the states in the state set to locate an active state, the active state having the highest of the probabilities, (d) removing an action from the list of possible actions, the action corresponding to the highest of the probabilities, (e) adding a new state to the list of states, and (f) calculating a new state tile set and new state action set stochastically based on a video model, a user-interaction model, and an operating mode. Calculating a new state tile set can include, but is not limited to including, (g) computing the mean and the standard deviation of a probability mass function, (h) computing a first discretized representation of the image offset reference based on the discretized representation of the image, a viewport, and a set of panned pixels, (i) computing a second discretized representation of the image offset reference based on the discretized representation of the image, the viewport, and a view ratio zoomed, (j) marking each of the tiles in the tile list in the active states based on the actions corresponding to the tiles, the corresponding actions being based on the first discretized representation of the image offset reference, the second discretized representation of the image offset reference, the mean, and the standard deviation, (k) creating a new state based on the marked tiles, and (l) repeating steps (a)-(l) until the number of the marked tiles meets a pre-selected threshold.

Figure 5:
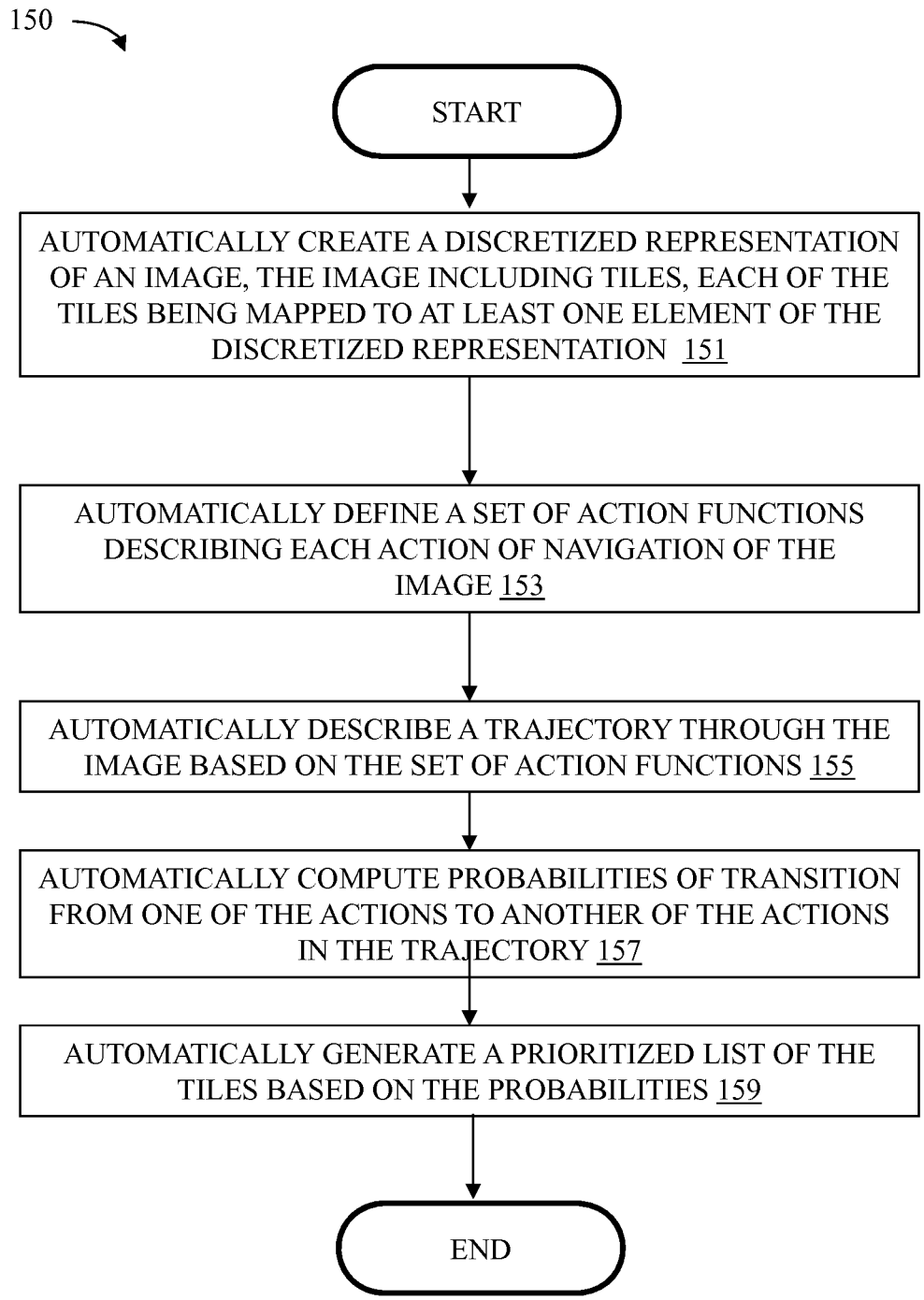
FIG. 5 is a flowchart of the method of the present embodiment.

Referring now to FIG. 5, method 150 for prioritizing image tiles can include, but is not limited to including, automatically creating 151 a discretized representation of an image. The image can include tiles, and each of the tiles can be mapped to at least one element of the discretized representation. Method 150 can also include automatically defining 153 a set of action functions describing each action of navigation of the image, and automatically describing 155 a trajectory through the image based on the set of action functions. Method 150 can still further include automatically computing 157 probabilities of transition from one of the actions to another of the actions in the trajectory, and automatically generating 159 a prioritized list of the tiles based on the probabilities. The image can optionally include motion imagery.

Method 150 can optionally include prefetching the tiles into a cache based on the prioritized list, and evicting the tiles from a cache based on the prioritized list. Method 150 can still further optionally include maintaining a state set including a list of states, each of the states containing a set of the tiles corresponding to a viewport and a set of possible of the actions for the state, and preparing the prioritized list based on the state set. Method 150 can even further optionally include creating the state based on steady state probabilities and one of the actions from a previous of the states, the previous of the states based on the trajectory, and calculating references to the discretized representation of the image based on the state, the set of tiles, and the action from the previous state. Method 150 can also include (a) setting the list of states to an initial state, the initial state including a tile set having references to the discretized representation of the image of the tiles in the viewport, (b) setting the probabilities of the list of possible actions for the state equal to the steady state probabilities, (c) traversing each of the list of possible actions of each of the states in the state set to locate an active state, the active state having the highest of the probabilities, (d) removing an action from the list of possible actions, the action corresponding to the highest of the probabilities, (e) adding a new state to the list of states, (f) calculating a new state tile set and new state action set stochastically based on a video model, a user-interaction model, and an operating mode. Calculating a new state tile set can include, but is not limited to including, (g) computing the mean and the standard deviation of a probability mass function, (h) computing a first discretized representation of the image offset reference based on the discretized representation of the image, a viewport, and a set of panned pixels, (i) computing a second discretized representation of the image offset reference based on the discretized representation of the image, the viewport, and a view ratio zoomed, (j) marking each of the tiles in the tile list in the active states based on the actions corresponding to the tiles, the corresponding actions being based on the first discretized representation of the image offset reference, the second discretized representation of the image offset reference, the mean, and the standard deviation, (k) creating a new state based on the marked tiles, and (j) repeating steps (a)-(j) until the number of the marked tiles meets a pre-selected threshold. The number of marked tiles can be used in a future count. Actions can be filtered based pre-selected prediction values. The probability mass function can either be, for example, but not limited to, Gaussian or histogram. One of the histograms can be defined for each action parameter, and each of the histograms can have bins. The bin probability can be defined for each of the bins based on each of the histograms. A pre-selected number of the bins can be chosen based on the highest values of the bin probabilities, and the tiles can be marked based on the chosen bins, the first discretized reference of an image offset reference, and the second first discretized reference of an image offset reference. The user-interaction model can either be, for example, but not limited to, adaptive and non-adaptive. A discretized representation of the image offset list can be generated based on the discretized representation of the image offset references, and the priorities list can be generated based on the discretized representation of the image offset list and the current viewport.

Raw data and results from the computations of the systems and methods present embodiments can be stored for future retrieval and processing, printed, displayed, transferred to another computer, and/or transferred elsewhere. Electronic communications 133 (FIG. 4) can be wired or wireless, for example, using cellular communication systems, military communications systems, and satellite communications systems. Any software required to implement the system can be written in a variety of conventional programming languages. System 100 (FIG. 4), including any possible software, firmware, and hardware, can operate on a computer having a variable number of CPUs. Other alternative computer platforms can be used. The operating system can be, for example, but is not limited to, WINDOWS® or LINUX®.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in a high-level programming language. Alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again to FIGS. 4 and 5, method 150 (FIG. 5) can be, in whole or in part, implemented electronically. Signals representing actions taken by elements of system 100 (FIG. 4) and other disclosed embodiments can travel over at least one live communications network 133 (FIG. 4). Control and data information can be electronically executed and stored on at least one computer-readable medium such as, for example, image data 131 (FIG. 4). System 100 (FIG. 4) can be implemented to execute on at least one computer node 114 (FIG. 4) in at least one live communications network 133 (FIG. 4). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer method for prioritizing image tiles comprising:
   automatically creating by a computer a discretized representation of an image, the image including tiles, each of the tiles being mapped to at least one element of the discretized representation;
   automatically defining by the computer a set of action functions describing each action of navigation of the image, the action functions including at least one of a pan, a zoom, and a seek function;
   automatically describing by the computer a trajectory through the image based on the set of action functions;
   automatically computing by the computer probabilities of transition from one of the actions to another of the actions in the trajectory;
   automatically generating by the computer a prioritized list of the tiles based on the probabilities;
   maintaining a state set including a list of states, each of the states being created based on steady state probabilities and one of the actions from a previous of the states, the previous of the states based on the trajectory and containing a set of the tiles corresponding to a viewport and a set of possible of the actions for the state;
   calculating references to the discretized representation of the image based on the state, the set of tiles, and the action from the previous state; and
   preparing the prioritized list based on the state set;
   wherein the step of calculating the references comprises:
   (a) setting the list of states to an initial state, the initial state including a tile set having references to the discretized representation of the image of the tiles in the viewport;
   (b) setting the probabilities of the list of possible actions for the state equal to the steady state probabilities;
   (c) traversing each of the list of possible actions of each of the states in the state set to locate an active state, the active state having the highest of the probabilities;
   (d) removing an action from the list of possible actions, the action corresponding to the highest of the probabilities;
   (e) adding a new state to the list of states; and
   (f) calculating a new state tile set and new state action set stochastically based on a video model, a user-interaction model, and an operating mode, wherein the step of calculating a new state the set comprises:
   (1) computing the mean and the standard deviation of a probability mass function;
   (2) computing a first discretized representation of the image offset reference based on the discretized representation of the image, a viewport, and a set of panned pixels;
   (3) computing a second discretized representation of the image offset reference based on the discretized representation of the image, the viewport, and a view ratio zoomed;
   (4) marking each of the tiles in the tile list in the active states based on the actions corresponding to the tiles, the corresponding actions being based on the first discretized representation of the image offset reference, the second discretized representation of the image offset reference, the mean, and the standard deviation;

(5) creating a new state based on the marked tiles; and (6) repeating steps (1)-(5) until the number of the marked tiles meets a pre-selected threshold.

2. The method as in claim 1 wherein the image comprises motion imagery.

3. The method as in claim 1 further comprising:
prefetching the tiles into a cache based on the prioritized list.

4. The method as in claim 1 further comprising:
evicting the tiles from a cache based on the prioritized list.

5. The method as in claim 1 further comprising:
using the number of marked tiles in a future count.

6. The method as in claim 1 further comprising:
filtering actions based on pre-selected prediction values.

7. The method as in claim 1 further comprising:
selecting the probability mass function from a group consisting of Gaussian and histogram.

8. The method as in claim 7 further comprising:
defining one of the histograms for each action parameter, each of the histograms having bins;
defining a bin probability for each of the bins based on each of the histograms;
choosing a pre-selected number of the bins based on the highest values of the bin probabilities; and
marking the tiles based on the chosen bins, the first discretized reference of an image offset reference, and the second first discretized reference of an image offset reference.

9. The method as in claim 1 further comprising:
selecting the user-interaction model from a group consisting of adaptive and non-adaptive.

10. The method as in claim 1 further comprising:
generating a discretized representation of the image offset list based on the discretized representation of the image offset references; and
generating the priorities list based on the discretized representation of the image offset list and the current viewport.

* * * * *